Patented Oct. 22, 1940

2,218,900

UNITED STATES PATENT OFFICE 2,218,900

EPHEDRINE IODIDE AND COMPOUND

Bernard L. Wyatt, Tucson, Ariz., assignor to The Wyatt Research Foundation, Tucson, Ariz., a corporation of Arizona No Drawing. Application July 26, 1937, Serial No. 155,779

2 Claims. (Cl. 167—58)

This invention relates to a preparation of ephedrine with thymol iodide and the incorporation thereof in a compound for the treatment of asthma and hay fever. The especial therapeutic value of the compound lies in the availability of combined iodine and ephedrine in joint administration. The effects of iodine and ephedrine when employed singly in asthma treatment are well established and their pharmacological action in combination, as employed by me, constitute a most important improvement in medication.

Medicinal treatment of asthma at the present time consists largely of the hypodermatic use of adrenalin, ephedrine, morphine or atropine. The use of iodized oil by intratracheal injection is being practiced and the administration of iodides by mouth as an expectorant is also known.

I have found a method of preparing ephedrine with thymol iodide and have incorporated this material in a preparation intended for intratracheal injection and inhalation in the effective treatment of asthma and its common complications, such as bronchitis, bronchiectasis and emphysema.

In the treatment of asthma it is important that the medication acts directly upon the affected tissues and be a preparation which is relatively stable, non-toxic and slowly absorbable by the tissues to permit of longer duration of dosage.

The efficacy of ephedrine and iodine for this therapy is proven, but their use in conjunction with mineral oil has led to complications. I have found poppy seed oil to be free from this danger, a most desirable solvent and essentially unique because of its chemical and physical properties and its iodine and saponification numbers.

Thymol iodide contains 43% available iodine and the bactericidal effect of iodine from it is obviously much greater and more prolonged, in situ, than when administered in any other manner. Its combination with ephedrine alkaloid produces a much more effective and prolonged ephedrine alkaloid action and when administered in combination as ephedrine and an iodide by intratracheal injection these effects are produced in the bronchioles at the point of infection.

As a specific example, the following is given as for the preparation of my compound.

From 5 to 10 grains of thymol iodide are dissolved in one-half ounce of poppy seed oil and from 3 to 5 grains of ephedrine alkaloid are dissolved separately in one-half ounce of poppy seed oil. Both chemicals enter readily into solution. Occasionally, a slight opalescence appears in the thymol iodide, poppy seed oil solution and whenever this occurs, the solution is filtered. This variation can be entirely eliminated and the resultant compound stabilized by subjection to a temperature of 100° F. for thirty minutes. It may also be necessary to dry the ephedrine alkaloid over sulphuric acid since because of its hygroscopic properties it may have absorbed sufficient water to interfere with its solution in the poppy seed oil.

The solution of thymol iodide is now added to the solution of ephedrine alkaloid and allowed to stand for from 30 to 60 minutes. When these substances are mixed there is a chemical reaction with ephedrine and an iodide as the end result.

Free thymol is evolved during this reaction.

To the mixed solution is then added 5 to 7 grains of menthol, 2 to 4 grains of camphor and from 2 to 3 minims of oil of thyme. The entire preparation is done at room temperature without exposure to bright sunlight. The exact proportions used depend upon whether the compound is to be used intratracheally by the physician, or for self-medication for asthma or hay fever by the patient by means of a nasal douche tube, an atomizer or a vaporizer. For intratracheal injection the lower concentration is preferable, leaving the higher concentration for inhalation. The quantities given are to make one ounce of the preparation. In the storing and distribution of the product, protection from light is essential and colored glass containers are used and storage in cool places is recommended.

I have thus produced a new and useful medicinal compound, containing ephedrine and an iodide, having different therapeutic effects (when introduced intratracheally) from iodides, iodine or ephedrine alkaloid otherwise administered as such. X-ray examinations demonstrate that a single intratracheal injection of from 2 to 5 cc. of my compound will not disappear from the bronchioles for several days and repeated fluoroscopic examinations of numerous treated patients show from two to twelve days elapsed before the compound has disappeared from the bronchi.

Clinically these patients show evidence of prolonged bactericidal action and equally sustained circulatory and physiological responses, rarely requiring hypodermatic injections of either ephedrine or epinephrine for the control of asthmatic paroxysms.

The transglottic technic with the patient seated in front of the operator is carried out by grasping the tongue firmly with a pad of gauze and drawing it forward as far as possible. A dose of from 2 to 5 cc. of the compound is intratracheally injected slowly by means of a syringe fitted with a Pilling tip with the patient breathing deeply. Inclination of the body of the patient will direct the larger portion of the dose to either the right or left lobe of the lungs, as desired. It is usually unnecessary to anesthetize the pharynx but if exaggerated swallowing and coughing reflexes are present local anesthetic is sprayed or injected. Heating the compound to 100° F. is indicated for treatment of highly nervous patients, to reduce the cough reflex.

For hay fever treatment the medication is by inhalation or nasal douche only, with the higher concentration used.

What I claim is:

1. The reaction product of ephedrine alkaloid and thymol iodide in a solution of poppy seed oil.

2. The process of preparing an ephedrine iodide compound which comprises dissolving ephedrine alkaloid in poppy seed oil, dissolving thymol iodide in poppy seed oil, combining both solutions and allowing the evolution of free thymol from such combined solutions.

BERNARD L. WYATT.